United States Patent
Ng et al.

[11] Patent Number: 5,159,357
[45] Date of Patent: Oct. 27, 1992

[54] NON-IMPACT PRINTER FOR RECORDING IN COLOR

[75] Inventors: Yee S. Ng, Fairport; Mary A. Hadley, Greece; Jeffrey A. Small, Chili, all of N.Y.

[73] Assignee: Eastman Kodak Company, Rochester, N.Y.

[21] Appl. No.: 543,931

[22] Filed: Jun. 26, 1990

[51] Int. Cl.$^5$ .................. G03G 15/01; G01D 15/06
[52] U.S. Cl. ..................................... 346/157; 346/154
[58] Field of Search .......................... 346/154, 157

[56] References Cited

U.S. PATENT DOCUMENTS

| | | | |
|---|---|---|---|
| 4,768,046 | 8/1988 | Minor et al. | 346/157 X |
| 4,779,106 | 10/1988 | Mills | 346/154 |
| 4,831,395 | 5/1989 | Pham et al. | |
| 4,885,597 | 12/1989 | Tschang et al. | 346/154 |
| 4,941,003 | 7/1990 | Takeda et al. | 346/154 X |
| 4,959,669 | 9/1990 | Haneda et al. | 346/157 |

Primary Examiner—George H. Miller, Jr.
Attorney, Agent, or Firm—Norman Rushefsky

[57] ABSTRACT

In a multi-color electrophotographic reproduction apparatus employing a non-impact electro-optic exposure source, good color balance is obtained by changing the exposure intensity of the recording elements for each different color being imaged. A dot printer apparatus produces a series of different color-resolved electrostatic latent images on a recording member. The apparatus includes an array of discrete elements for dot recording on the recording medium. The elements are selectively enabled for predetermined periods of time during a cycle of operation to form a color-resolved electrostatic latent image on the recording member. Each charged latent image is developed with selected toner particles according to its resolved color. A control signal representative at least in part of the resolved color of each latent image is produced, and the control signal determines the intensity of the elements during each cycle of operation according to each resolved color. The intensity is changed by modifying a voltage bias in a current mirror regulated current driver.

16 Claims, 6 Drawing Sheets

NON-IMPACT PRINTER FOR RECORDING IN COLOR

CROSS REFERENCE TO RELATED APPLICATIONS

This application is related to the following applications filed on even date herewith:

1. U.S. Application Ser. No. 07/543,892, filed in the names of Mary A. Hadley et al and entitled, "Non-impact Printer Apparatus with Improved Current Mirror Driver"

2. U.S. Application Ser. No. 07/543,891, filed in the name of Jeffrey A. Small and entitled, "L.E.D. Printer Apparatus with Improved Temperature Compensation;"

3. U.S. Application Ser. No. 07/543,930, filed in the name of Jeffrey A. Small et al and entitled, "Non-Impact Printer with Token Bit Control of Data and Current Regulation Signals;"

4. U.S. Application Ser. No. 07/543,929, filed in the names of Martin Potucek et al and entitled, "L.E.D. Array Printer with Extra driver Channel."

5. U.S. Application Ser. No. 07/543,507, filed in the names of Mike Mattern et al and entitled, "L.E.D. Printhead with Improved Current Mirror Driver and Driver Chip Therefor."

BACKGROUND OF THE INVENTION

FIELD OF THE INVENTION

The present invention relates to non-impact printing apparatus for printing characters, halftone images, grey scale image and the like with small picture elements (pixels) or dots.

DESCRIPTION OF THE PRIOR ART

In the prior art (as exemplified by U.S. Pat. No. 4,768,046) dot printers employing recording elements such as stylus, laser, ink jet, light emitting diodes (LED's), and the like are known. As an example, LED print apparatus comprise a multiplicity of individually addressable, point-like radiation sources that are arranged in a row or rows for exposing points upon a recording medium during movement of the medium relative to, and in a direction normal to, the row or rows. Driver circuits are provided for simultaneously energizing the radiation sources responsive to respective image or data bit input signals applied to the driver circuits during an information line period.

Usually, electrophotography produces positive prints when the original subject matter is in the positive form. However, for dot printers, it is often convenient to produce positive prints from negative exposure by so called "reversal" development. In reversal development, a recording medium is charged to a uniform unexposed primary voltage $V_0$ and image-wise discharged to an exposure voltage $V_E$. The exposed areas of the recording medium are toned at a development station having a bias voltage $V_B$. The difference between $V_0$ and $V_B$ is carefully maintained at a constant value to inhibit both background images and developer pickup. The difference between $V_0$ and $V_E$, herein referred to as $\Delta V$, is a factor in determining the image density.

Another factor in determining image density is the charge-to-mass ratio of the toner particles. For the same $\Delta V$, image density varies inversely with toner charge-to-mass ratio. This is of concern in multi-color machines since each color toner generally has a different charge to mass ratio and will therefore tone differently from other colors. If uncompensated for, this will cause a color imbalance in the final print.

One form of such compensation entails changing $\Delta V$ between frames of different color-resolved latent images by adjusting the primary charge $V_0$ in the interframe. For example, the recording medium is charged to a fixed value and then, according to the color-resolved latent image for the frame, the charge is reduced appropriately by means of a light source such as an electroluminescent panel.

As noted in the prior art, a disadvantage of the system described is the cost of the voltage-reducing light source (the electroluminescent panel) and its power supply. Further, since the bias voltage $V_B$ must follow $V_0$, there must be as many $V_B$ power supplies as there are color development stations, or there must be a programable power supply. Either of these devices is also expensive.

The prior art further notes that in multi-color reversal development, good color balance can be obtained by changing the time duration of exposure for each different color frame rather than by changing the level of primary voltage $V_0$. A problem with this is the requirement that a memory be provided for storing the "on" time for each LED for exposing a pixel of each color or at least a means for calculating an exposure for each LED for each image frame of different color. In a grey level printhead providing uniformity correction for LED's, this tends to add undue complexity to such apparatus and it is object of the invention to overcome this problem but yet provide a printing apparatus with good color balance on input.

The invention, and its objects and advantages, will become more apparent in the detailed description of the preferred embodiments presented below.

SUMMARY OF THE INVENTION

The above and other objects are realized by a multicolor reproduction apparatus for recording differently colored images on a recording member, the apparatus including a recording medium; an array of discrete elements for dot recording on the recording medium, driving means for selectively enabling the elements for predetermined periods of time during a cycle of operation to form an image on the recording member; means for producing a control signal representative at least in part of the color of the image; and digitally addressable means responsive to said control signal for changing the current to the elements during each cycle of operation according to each color to be recorded.

The invention is further realized by a non-impact printer apparatus used for recording which comprises a plurality of recording elements, digitally addressable current-conducting means for selectively establishing a bias current in response to a multibit digital signal; means responsive to said bias current for generating a bias current; means for selectively causing current to flow through recording elements selected for energization; current mirror means responsive to said bias voltage for regulating current through said selected recording elements, the level of current being related to said bias current, and means for adjusting the bias voltage by providing a digital signal to the digitally addressable current-conducting means which digital signal is in response to the color of the image being recorded.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

The apparatus of the preferred embodiment will be described in accordance with an electrophotographic recording member. The invention, however, is not limited to apparatus for creating images on such a member, as other media such as photographic film etc. may also be used with the invention.

Because electrophotographic reproduction apparatus are well known, the present description will be directed in particular to elements forming part of or cooperating more directly with the present invention. Apparatus not specifically shown or described herein are selectable from those known in the prior art.

Figure 1:
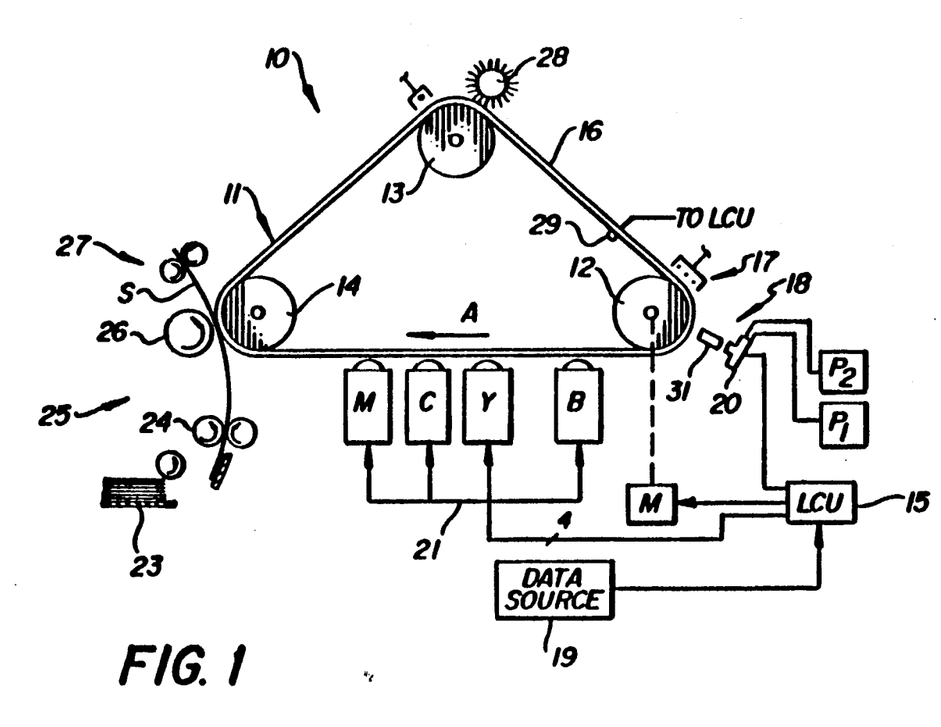
FIG. 1 is a schematic of a print apparatus in accordance with the invention.

With reference now to FIG. 1, an electrophotographic reproduction apparatus 10 includes a recording member such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a logic and control unit (LCU) 15. When the switch is closed, roller 12 is driven by motor M and moves web 11 in clockwise direction as indicated by arrow "A". This movement causes successive image areas of web 11 to sequentially pass a series of electrophotographic work stations of the reproduction apparatus.

The work stations include a charging station 17 at which the photoconductive surface 16 of the web 11 is sensitized by applying a uniform electrostatic primary charge $V_O$ of a predetermined voltage. An exposure station 18 forms a series of different color-resolved electrostatic latent images by modulating the primary charge on an image area of the surface 16 with selectively enabled discrete elements for dot recording in accordance with color-resolved control signals provided by a data source 19. The point-like elements are supported in a print head 20. The selectively enableable elements are preferably radiation sources such as LED's. Optical means 31, such as a Selfoc lens, may be provided for focusing light from each of the LED's onto a transverse line on the photoconductive surface.

A four-color development station 21 includes developer which may consist of iron carrier particles and electroscopic toner particles with an electrostatic charge. In response to signals from the LCU regarding the color of a respective image frame to be developed, developer with appropriately colored toner is brushed over photoconductive surface 16 of the web 11, and toner particles adhere to the color-resolved latent electrostatic image to form a visible toner image. Actuators (not shown) may be located along the inside of the web 11 to selectively move the web into developing relationship with a respective color development station.

A copy sheet S is fed from a supply 23 to drive rollers 24, which then urge the sheet to move forward onto web 11 in alignment with a color-resolved toner image at a transfer station 25. At a roller 26, the toner image on web 11 is transferred to copy sheet S. If additional color-resolved toner images are to be transferred to sheet S, the sheet is held on roller 26 and brought back into contact with web 11 in register with subsequent toner images. Conventional means (not shown) such as a vacuum source or mechanical fingers may be used to hold the sheet on the roller 26 and release same in response to signals from LCU 15. After the transfer of all unfixed toner images to a copy sheet S, the sheet is transported to a heated pressure roller fuser 27 where the image is fixed to the copy sheet.

At a cleaning station 28, the photoconductive surface 16 of the web 11 is cleaned of any residual toner particles remaining after the toner images have been transferred.

Web 11 has a plurality of indicia such as perforations along one of its edges to coordinate operation of the various work stations 17, 18, 21, and 25 with movement of the image areas on the web. These perforations generally are spaced equidistantly along the edge of web 11. At a fixed location along the path of web movement, there is provided suitable means 29 for sensing web perforations. This sensing produces input signals to LCU 15 which has a digital computer, preferably a microprocessor. The microprocessor has a stored program responsive to the input signals for sequentially actuating, then deactuating the work stations as well as for controlling the operation of any other machine functions. Additional encoding means may be provided as known in the art for providing more precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
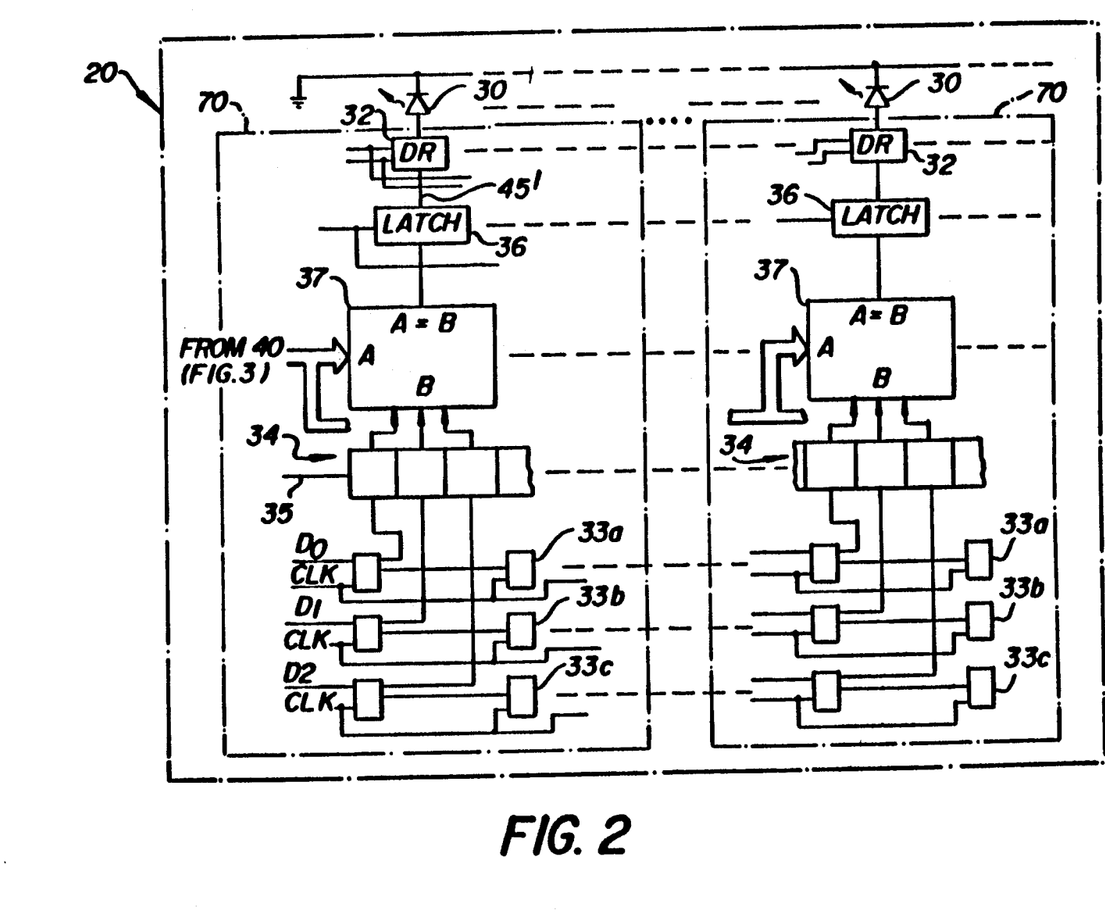
FIG. 2 is a block diagram of a driver circuit for use in a printhead forming a part of the print apparatus of FIG. 1.

With reference to FIG. 2, print head 20 comprises a suitable support with a series of LED's 30 arranged in a row so that the LED's (only two of which are shown) extend across the width of web 11. Conventionally LED's are formed in chip arrays containing say 128 LED's with the chip arrays arranged end to end to form a single row of say 3584 LED's on the printhead. Driver circuits 70 are arranged on both sides of the row of LED's with each driver chip having the circuitry for driving 64 LED's. Thus, two of the integrated circuit driver chips 70 can be used to drive the 128 LED's on one chip array with one driver chip used to drive the odd-numbered LED's and the other the even-numbered LED's. The driver circuitry includes logic devices for receiving data signals for the various LED's supported by that chip as well as a current driver to control whether or not an LED is to be turned on and for how long as well. While the driver chip circuit 70 shows it supports one LED, it will be understood that similar circuitry is incorporated on the chip to support 64 LED's. Circuit 32 provides a regulated current powered by a power source "P" (FIG. 1) for illuminating the LED during each cycle of operation to a desired intensity for forming a pixel or picture element recording dot on web 11.

The duration of the enablement time is determined by control signals $D_0$, $D_1$, and $D_2$. The control signal for each LED comprises a multi-bit data signal that is representative of the pixel size or gray scale density to be recorded by the LED on web 11.

The use of for example three bits of data for each pixel allows for eight pixel size variations (including no size, i.e. no illumination by the LED). The use of 3 bits to define an image control signal is used as an example, it being understood that more than 3 bits will provide better control of imaging. For each LED, three serial shift registers 33a, 33b and 33c are used to score each of the data bits. Rasterized data in the form of binary logic signal ones or zeros is serially shifted down each of shift registers 33a, 33b, and 33c under control of clock pulses until all shift registers are full. A latch signal on line 35 then enables a three-bit latch register 34 associated with each LED to latch the output of the shift registers.

The multi-bit output of latch registers 34 are now compared in a comparator 37 with a descending count from an up/down counter 40 (FIG. 3) that is under clock control. The counter will count down from decimal seven. When there is a match between the outputs of counter 40 and three-bit latch register 34 for that LED, a latch 36 is enabled that causes current driving circuit 32 to initiate current to LED 30. A circuit substantially similar to the circuit shown in FIG. 2 is described in U.S. Pat. No. 4,750,010, the contents of which are incorporated by this reference. A further improvement for providing grey level data to a printhead in an efficient manner is described in U.S. Pat. No. 4,746,941, the contents of which are also incorporated by this reference. The LED will remain enabled until the counter after counting down to zero has counted back up to a count where there is once again a match of the output of counter 40 and latch register 34.

Figure 3:
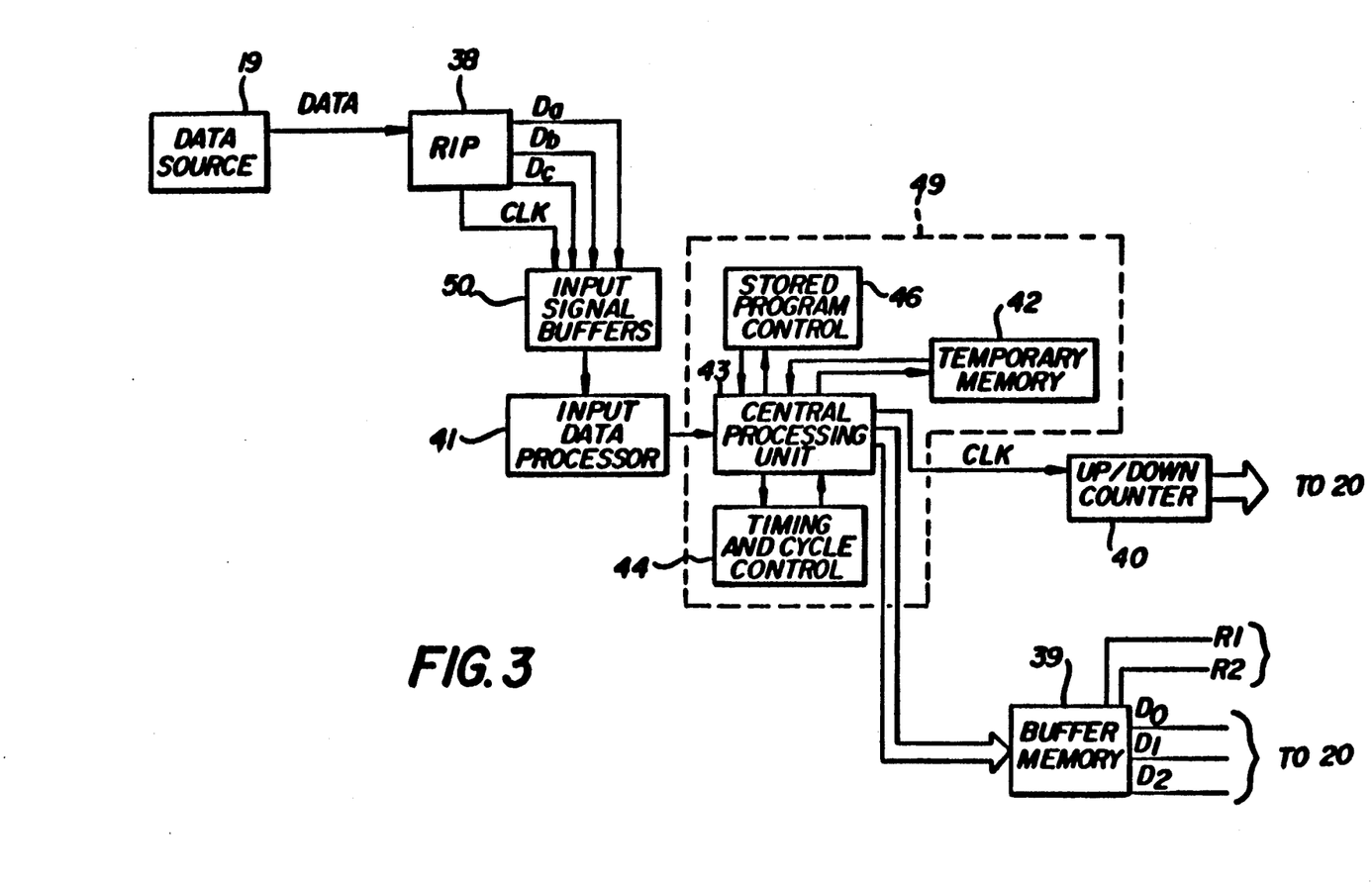
FIG. 3 is a block diagram of circuitry used in the print apparatus of FIG. 1 and FIGS. 4A, B and C are a schematic of a current-driving circuit forming a part of the driver circuit of FIG. 2.

FIG. 3 shows the means for providing control signals to print head 20 from a data source 19 which may be a computer, word processor, image scanner, etc. This data is fed to a conventional raster image processor (RIP) 38 which processes the incoming digital coded signals into digital rasterized image data signals $D_a$, $D_b$, $D_c$ suitable for forming the appropriate pixel size mandated by the control signal during a production run or print job.

One or more lines of rasterized image data signals are input to a circuit which may comprise a microcomputer 49 or logic circuit forming a part of LCU 15.

The rasterized data is input to a microcomputer 49 through input signal buffers 50 and input data processor 41. The microcomputer includes a central processing unit 43, stored program control 46, temporary memory 42 and timing and cycle control unit 44. In accordance with a program in stored program control 46, the microcomputer examines the image data signals and produces a control signal for each LED representative of the image content. This control signal is output to a buffer memory 39 which temporarily stores same for output to the printhead 20. Also generated by the microcomputer are the clock signals for changing the count in counter 40.

In the simple case wherein the printing of data is to be of the binary type of printing (i.e., an LED is either on or off), the print head logic as shown in U.S. Pat. No. 4,831,395 may be used wherein a strobe signal defines the on-time of the LED in a binary printer. See also U.S. Pat. No. 4,750,010. In the LED printheads described in these patents, a strobe signal is logic "ANDed" with a data signal and the LED on-time is controlled by the duration of the strobe signal. The embodiment of FIG. 3 may be used also as a binary printhead and in a simple case, the multiple bits of information for each LED are used to determine enablement time of an LED only for uniformity compensation. In the stored program control memory of the microcomputer there may be provided algorithms for calculating an adjustment or correction factor for the LED's based on their observed nonuniformities of light emissions. Such an algorithm will be based on experimental observed behavior for the types of LED's and the electrophotographic process used. The algorithm may also have service-adjustable or feedback adjustable parameters for adapting to specific printers. The data for each LED is modified by the adjustment factor. In the example of a binary printer, data from the raster image processor associated with each LED will be either a logic one or zero, depending upon whether an LED is to be illuminated or not illuminated. This data is then provided to the microcomputer which adjusts the data to an enablement time that is appropriate for that LED. This enablement time is provided as a multi-bit digital signal to buffer memory 39. The multi-bit signal is then sent to the printhead and "treated" by the print head as a gray scale data input in accordance with the description provided above for the print head of FIG. 2.

Where the data source provides gray scale data and the printer is to be operated as a true gray scale printer, a multi-bit data signal from the raster image processor has the data for each LED modified by an adjustment based on that LED's characteristic for light emission. A correction factor is determined and the corrected data sent to memory 39 for printing by the print head of FIG. 2.

Figure 4A:
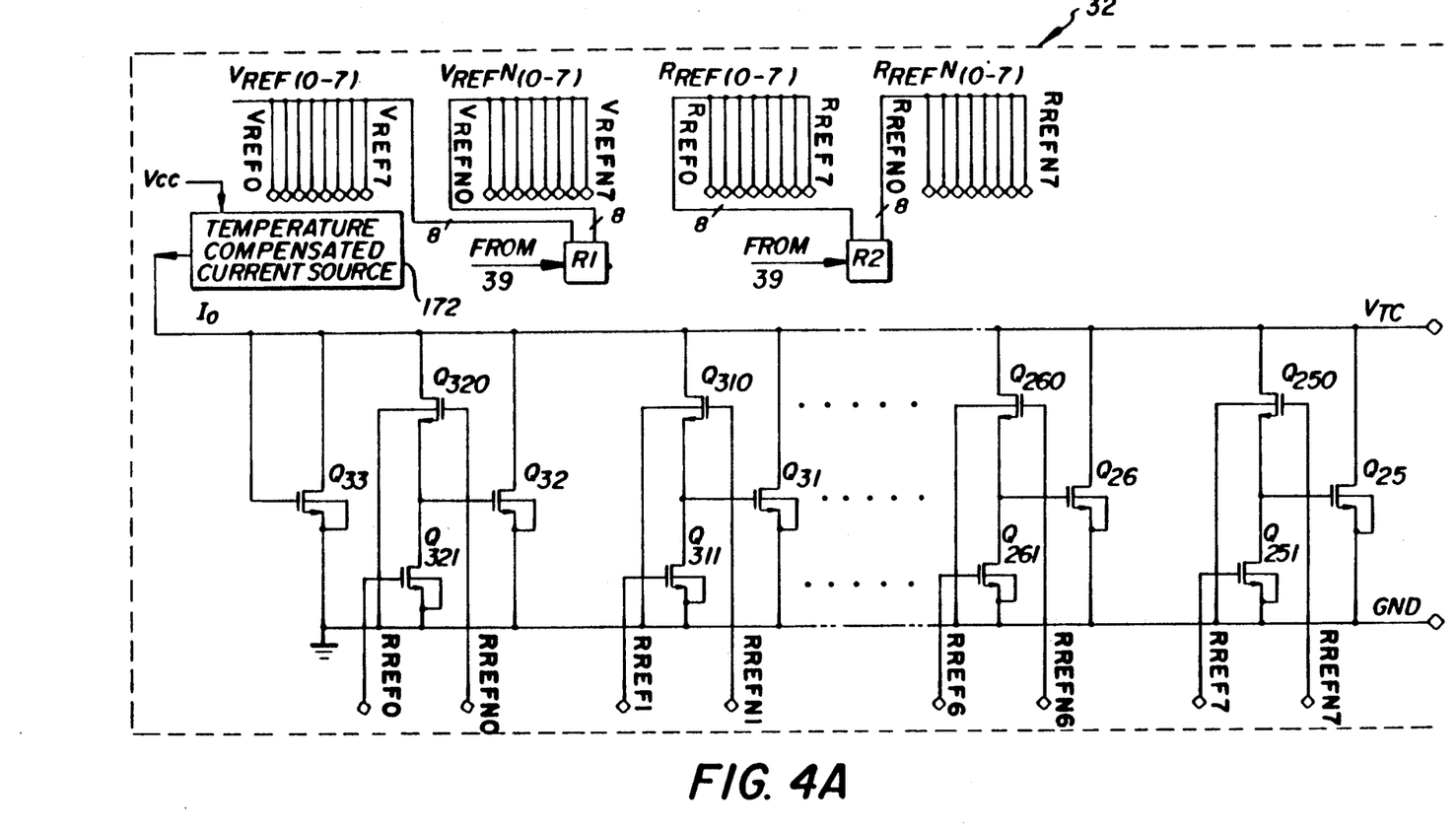

With reference now to FIGS. 4A, B and C, the current driving circuit 32 portions of each driver chip 70 is shown. The respective outputs of the LATCH registers 36 are fed over respective lines $45^1$, $45^3$, and the following lines not shown $45^5$, - - - $45^{125}$, $45^{127}$. As may be seen each of these lines is actually a double line one of which carries an enable signal to turn the respective LED on and the other carries a complement of this signal. The lines $45^1$ are input to respective control electrodes of transistors $Q_{426}$, $Q_{427}$. These transistors act as switches and form a part of a current mirror driving circuit that includes a master circuit formed by transistors $Q_{424}$, $Q_{425}$ and a series of digitally controlled transistors. More details concerning the digitally controlled transistors will be found below with reference to the discussion of FIGS. 4A and 4B. Briefly, these digitally controlled transistors may be selectively turned on to establish a signal I (CHIP BIAS) to thereby regulate a desired current level for the LED's driven by this driver chip. As may be noted in FIG. 4C, circuitry for driving two LED's, i.e., $LED_1$ and $LED_3$ are illustrated; it being understood that the driver chip would have appropriate circuits typified by those described below for driving say 64 of the odd-numbered LED's in an LED chip array having, for example, 128 LED's. Another driver chip on the other side of the LED chip array would be used to drive the 64 even-numbered LED's.

Figure 4B:
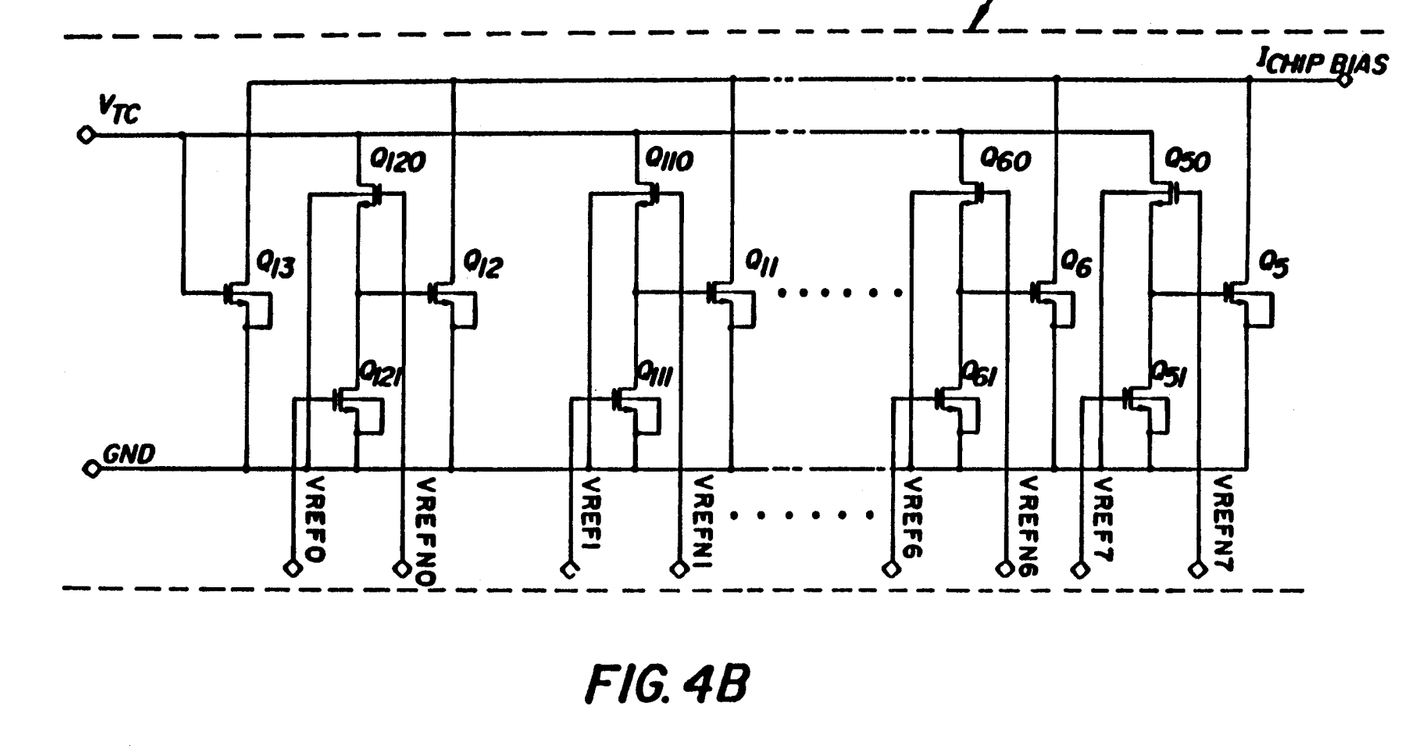
Figure 4C:
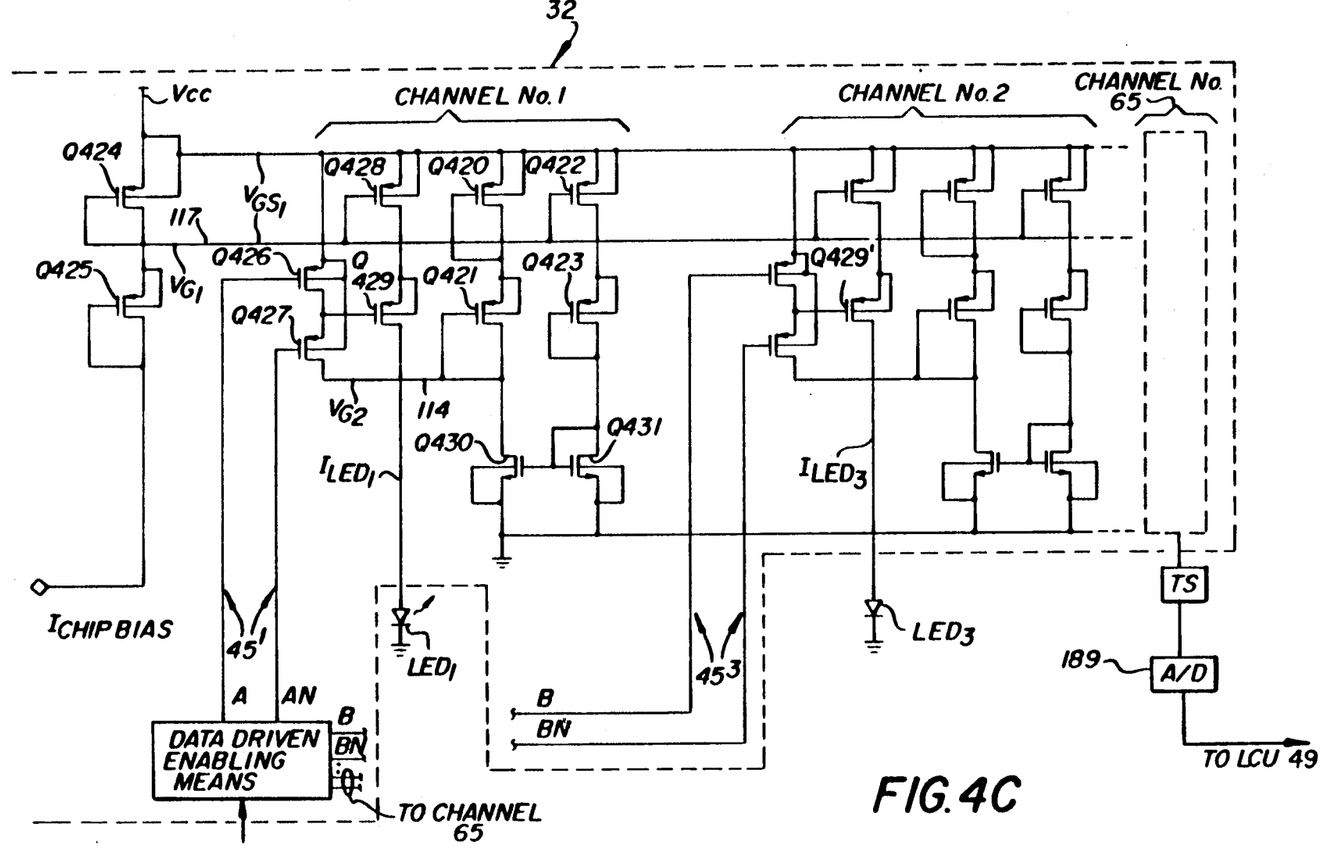

The current through the master circuit establishes a bias potential $V_{G1}$ on line 117. Directly in series with LED$_1$ are two transistors Q$_{428}$, Q$_{429}$. Transistor Q$_{428}$ is biased to be always conductive while transistor Q$_{429}$ is switched on and off and thus is the transistor controlling whether or not current is driven to LED$_1$. The gate or control electrode of transistor Q$_{429}$ is coupled to the drain-source connection of transistors Q$_{426}$, Q$_{427}$. When LED$_1$ is to be turned on, transistor Q$_{427}$ is made conductive and when LED$_1$ is to be turned off, transistor Q$_{425}$ is made conductive. The gate of transistor Q$_{426}$ receives a logic signal that is the inverse of that to gate Q$_{427}$ from a data driven enabling means that is actually the circuitry of FIG. 2 which controls whether or not an LED is to be turned on and for how long. As noted above in a grey level printhead, the LED is to be turned on for a duration determined by the grey level data signals input to the printhead.

Also associated with the circuitry for driving LED$_1$, is an additional current mirror that includes two slave circuits. One slave circuit comprises transistors Q$_{420}$, Q$_{421}$ and Q$_{430}$. The other slave circuit comprises transistors Q$_{422}$, Q$_{423}$ and Q$_{431}$. Transistors Q$_{430}$, Q$_{431}$ are N-channel MOSFETS while the other transistors noted above are P-channel MOSFETS. The two additional slave circuits associated with LED$_1$ are on continuously and assuming a nominal driving current of say I$_{LED1}$=4 ma to LED$_1$, the current through transistor Q$_{421}$ might be 1/80 I$_{LED1}$ and the current through transistor Q$_{423}$ might be 1/800×I$_{LED1}$. The currents through these slave circuits establishes a voltage level V$_{G2}$ on line 114, which is the potential of the drain electrode of transistor Q$_{427}$.

In operation with transistor Q$_{429}$ turned off, transistor Q$_{426}$ is on and impresses approximately the voltage V$_{cc}$ at the gate of transistor Q$_{429}$. When LED$_1$ is to be turned on to record a pixel (picture element), a signal is provided by the data enabling means of FIG. 2 to the gate of transistor Q$_{427}$ to turn same on, while an inverse signal turns transistor Q$_{426}$ off. Before transistor Q$_{429}$ turns on, the capacitive load existing between its gate and substrate must be discharged. When transistor Q$_{427}$ turns on the charge on the gate terminal of transistor Q$_{429}$ discharges through transistors Q$_{427}$ and Q$_{430}$. This path for discharge of the gate capacitive load at transistor Q$_{429}$ thereby provides a turn-on time not affected by the number of LED's that are sought to be simultaneously energized. The reason for this is that each control transistor corresponding to transistor Q$_{429}$ has its own respective path for discharge of its respective capacitive load. While the illustrated embodiment shows use of the additional current mirror circuit containing transistor Q$_{430}$ for use in discharging the control electrode of the driving transistor, it will be understood that in some circuit arrangements, charging, rather than discharging, of the control electrode may be facilitated.

Current through transistors Q$_{422}$, Q$_{423}$ and Q$_{431}$ is proportional to, i.e. mirrors, that through the master circuit because of the identical gate to source terminal biasing (V$_{GS1}$) of transistors Q$_{424}$ and Q$_{422}$. Thus, current is constant in this slave circuit even though V$_{cc}$ from power supply P$_2$ varies since the potential difference V$_{GS1}$ between the gate and source terminal of transistor Q$_{422}$ remains constant. The current through the slave circuit comprised of transistors Q$_{422}$, Q$_{423}$ and Q$_{431}$ is mirrored by that through the slave circuit comprised of transistors Q$_{420}$, Q$_{421}$ and Q$_{430}$ due to the identical gate to source biasing of transistors Q$_{430}$, Q$_{431}$. With a constant current being generated in the slave circuit comprised of transistors Q$_{420}$, Q$_{421}$ and Q$_{430}$, the potential difference between the gate and source terminals of transistor Q$_{420}$ remains fixed as does that of transistor Q$_{421}$ thereby establishing a voltage level V$_{G2}$ on line 14 which varies with V$_{cc}$ although the potential difference V$_{cc}$−V$_{G2}$ remains constant.

With the transistor Q$_{429}$ turned on and conducting driving current to LED$_1$ during an exposure period, the voltage level V$_{G2}$ is established at the gate of transistor Q$_{429}$ via now conducting transistor Q$_{427}$. The voltage level at the source terminal of transistor Q$_{429}$ is now at a fixed threshold value above that of V$_{G2}$. Transistor Q$_{429}$, acting as a cascode transistor and having its source terminal connected to the drain terminal of transistor Q$_{428}$, thereby establishes the drain potential of the transistor Q$_{428}$ as varying with changes in V$_{cc}$. As noted above, the potential difference V$_{GS1}$ is constant even though V$_{cc}$ itself varies. The voltage relationships between the various terminals of transistor Q$_{428}$ are not affected by variations in V$_{cc}$ and the current to LED$_1$ during a period for recording a pixel stays constant.

Thus, stability in driver current to LED$_1$ is provided since transient changes in V$_{cc}$ do not cause corresponding changes to the current conducted through LED$_1$ and thus do not affect the intensity level of light output by LED$_1$. The tendency in some LED printheads for light output of an LED to diminish when other LED's are turned on can also be reduced with this circuit. As noted above, transistor Q$_{429}$ conducts current to LED$_1$ for a time period controlled by the strobe signal or in the case of a grey level printer, for a period controlled by the data bits for recording an appropriate pixel. The level of current for recording this pixel is controlled by the current mirror which is responsive to the current level I(CHIP BIAS). The circuit for generating I(CHIP BIAS) forms a part of the invention and will now be described.

When transistor Q$_{429}$ is turned on, the current passing there through mirrors, i.e., is either the same or proportional to, the current passing through transistor Q$_{425}$. The current passing through transistor Q$_{425}$, in turn, is equal to I(CHIP BIAS). With reference now to FIGS. 4A and 4B, this current, I(CHIP BIAS), in turn is controlled by three factors comprising a temperature compensated current source 172, a first group of eight digitally controlled NMOSFET transistors Q$_{25}$, Q$_{26}$..., Q$_{31}$, Q$_{32}$ and a second group of eight digitally controlled NMOSFET transistors Q$_5$, Q$_6$..., Q$_{11}$, Q$_{12}$. Associated with the first group is a non-digitally controlled NMOSFET transistor Q$_{33}$. Similarly associated with the second group is non-digitally controlled NMOSFET transistor Q$_{13}$. As may be noted in FIGS. 4A and 4B, not all of the transistors are shown and the number of digitally controlled transistors provided in each group determines the level of control. Transistors Q$_{25}$, ..., Q$_{32}$ are parallel connected transistors whose respective gate width to gate length ratios are scaled so that their respective currents are scaled or weighted in powers of two. For example, where eight digitally controlled transistors are provided for this first group (Q$_{25}$–Q$_{32}$), respective gate width to gate length ratios may be $$\frac{256}{5} : \frac{128}{5} : \frac{64}{5} : \frac{32}{5} : \frac{16}{5} : \frac{8}{5} : \frac{4}{5} : \frac{2}{5} \text{ and } \frac{321.5}{5}$$

for non-digitally controlled transistor Q$_{33}$.

Each digitally controlled transistor is controlled by a logic signal applied to a respective two-transistor switch circuit associated with the transistor. For example, the circuit defined by NMOSFET transistors $Q_{250}$ and $Q_{251}$ cause current to flow through transistor $Q_{25}$ when a high level logic signal is applied to the gate of transistor $Q_{250}$ and a complementary low logic signal is applied to the gate of transistor $Q_{251}$. The logic signals for controlling which of the current-carrying transistors are to be turned on are controlled by a register $R_2$ which stores an 8-bit digital word and its 8-bit complement representing a desired current control signal to turn on respective ones of the eight current conducting transistors $Q_{25}, \ldots Q_{32}$. In conjunction with transistor $Q_{33}$, which is on continuously, this group of transistors is used for "localized" control of LED current. By this, it is meant that the digital word stored in register $R_2$ is specific for this driver chip and will be determined by adjustment of driver current to the LED's driven by this driver chip until the LED's each provide a desired light output level. This digital word may be input to the register $R2$ from memory in the LCU or from a separate memory such as a ROM provided on the printhead. This digital word may also be changed in response to the temperature of the driver chip, as say, measured by a suitable temperature sensor TS. See, for example, U.S. Pat. No. 4,831,395 regarding an LED printhead employing correction temperature compensation using adjustment of $V_{REF}$. See also U.S. Pat. No. 4,885,597. In cross-referenced U.S. application #4 there is provided a description of an LED printhead employing current mirrors to control current to the LED's in which the level of current from an extra current mirror channel (#65) on each driver chip is used as a measure of temperature. The detected current is compared by the LCU with a value representing current which should flow to the LED's based on the digital words in register R1 and R2. The temperature sensed by the sensor TS is communicated to the LCU 15 using an analog-to-digital converter 189 and in response thereto, the LCU "writes" a new digital word into register R2, if a change in current level is required according to an algorithm stored in memory. The sensor TS may generate a voltage across a resistor (not shown) in response to the current in the extra channel.

As noted in aforementioned U.S. Pat. No. 4,831,395, the contents of which are incorporated by this reference, the LCU may be programmed to maintain a count of prior activations of each LED and adjust a control voltage according to a program based on the aging characteristics of the printhead.

After this initial calibration and as the printhead ages through repeated use, both temperature and age factors operate to degrade light output. The affects due to aging will generally be similar to all LED's and are corrected for by adjustment of an 8-bit digital word and its 8-bit complement stored in register $R_1$. In addition there is provided in a stored program control memory 46 of LCU a color correction factor for adjustment of the 8-bit word determined for memory $R_1$. Thus, after an 8-bit word is calculated or otherwise determined based upon reading for a black and white recording there will be associated with such 8-bit word different respective 8-bit words for recording each of the cyan, magenta and yellow image frames. Thus, in response to the data source 19 indicating data having a color signal to be recorded in color the microcomputer 49 provides in synchronization with each respective color image frame an appropriate 8-bit word into respective registers $R_1$.

This digital word controls 8 current-carrying NMOSFET transistors $Q_5, \ldots, Q_{12}$. Associated with this group of transistors is a continuously conducting NMOSFET transistor $Q_{13}$. Exemplary gate width to length ratios for weighted digitally controlled transistors $Q_5$–$Q_{12}$ are $$\frac{896}{5} : \frac{448}{5} : \frac{224}{5} : \frac{112}{5} : \frac{56}{5} : \frac{28}{5} : \frac{14}{5} : \frac{7}{5} \text{ and } \frac{4027}{5}$$

for non-digitally controlled transistor $Q_{13}$. The 8-bit word and its 8-bit complement stored in register $R_1$ is the same as that stored in identical registers $R_1$ on the other driver chips. As the printhead ages, a new 8-bit digital word and its 8-bit complement is calculated by the LCU and color corrected for respective image frames before being input into the registers $R_1$. The calculation of this 8-bit word for aging and color correction may be based on empirical determinations made using similar printheads or based upon a calibration of this printhead using an optical sensor that senses the output from each or selected LED's or by sensing patches recorded on the photoconductor.

As noted above, a third factor for adjustment to maintain LED uniformity of light output from chip to chip is a temperature compensated current source 172. This current source includes a temperature sensor and circuitry which will assist in boosting current to the LED's in response to increases in temperature. Various circuits for accomplishing this are well known for example, see Gray and Meyer, Analysis and Design of Analog Integrated Circuits, 2nd edition, pages 733–735 and FIG. 12.28, the contents of which are incorporated by this reference. In this text description is provided of so-called $V_T$ (thermal voltage)-referenced current sources. By providing in such a circuit a resistor with an appropriate temperature coefficient, an output current, $I_o$, is provided that increases with an increase in temperature of the driver chip.

The operation of the circuit of FIGS. 4A, B and C will now be described. During use of the printhead the temperature of the driver chips will heat up differently in accordance with respective current carrying demands and abilities to dissipate heat caused by such demands through the heat conducting structure to which the chips are mounted. The temperature adjusted current $I_o$ is conducted to ground via NMOSFET transistor $Q_{33}$ and some or all of the transistors $Q_{32}, Q_{31}, \ldots$ and $Q_{25}$ depending upon the digital 8-bit signal and its 8-bit complement stored in register $R_2$. In accordance with which transistors in this group of transistors are enabled to conduct and recalling that these transistors are scaled or weighted differently in conducting capabilities the voltage level at the source terminal of $Q_{33}$ is determined. Note that switching transistors are associated with each of these digitally controlled transistors. For example, transistor $Q_{25}$ is controlled by switching transistors $Q_{250}$ and $Q_{251}$ in response to a signal causing $Q_{250}$ to conduct and $Q_{251}$ to turn off. The others are controlled similarly. This voltage level, $V_{TC}$, is also applied to the gate of transistor $Q_{13}$ and thereby controls the current conducted by transistor $Q_{13}$. As noted above, transistor $Q_{13}$ is the non-digitally controlled transistor associated with the digitally controlled transistor group $Q_5, \ldots, Q_{11}, Q_{12}$. In accordance with the digital word stored in register $R_1$ selected ones of these transistors are caused to conduct thereby affecting the bias current I (CHIP BIAS) through transistor $Q_{425}$.

Recall that the transistors in the group of transistors $Q_5$, ... $Q_{12}$ also have scaled or weighted current-conducting capabilities. The current through PMOSFET transistor $Q_{425}$ is the same as the current conducted through transistor $Q_{424}$, which current is replicated or scaled by current mirrors of PMOSFET slave transistors $Q_{429}$, $Q_{429'}$, ... etc., i.e., the current controlling transistors to $LED_1$, $LED_3$- - - $LED_{127}$, respectively as well as the extra temperature sensing circuit using channel 65. Transistor $Q_{429}$ is caused to conduct when its respective logic transistors $Q_{426}$, $Q_{427}$ are appropriately signaled by data signals indicating a pixel to be printed. Thus, when a logic low signal is applied to line $45^1$ (AN) transistor $Q_{427}$ turns on an biases the gate of transistor $Q_{429}$ to the level $V_{G2}$. The current through transistor $Q_{429}$ will mirror or be scaled to that of transistor $Q_{424}$ for the time period for exposing a pixel as controlled by the duration of the logic low signal on line $45^1$ (AN). As is noted in FIG. 4C, the current through $Q_{429}$ is fed to $LED_1$, for the recording of a pixel. Identical current levels will be developed in the other channels directly providing current to respective other LED's. Thus, all LED's driven by this driver chip receive the same current for periods determined by their respective enablement signals and the current level is adjusted depending upon the color of the image frame being recorded since corrected 8-bit words are being input into respective registers $R_1$ in synchronization with the recording of each image frame and thereby affecting the bias voltage $V_{GS1}$ which controls the level of current to each LED.

ADVANTAGES

An improved circuit for a current driver chip used in an LED printhead has been described. The circuit retains the desirable feature of two-way addressability described in the prior art. That is, provision is made for digitally addressing each chip to correct for differences in light output by LED's driven by one chip versus those driven by another chip on the same printhead. These differences can arise due to processing condition differences arising during manufacture of the driver chips and for their respective driven LED's, as well as nonuniformities arising from temperature differences. A second provision for digital addressability is retained to provide for global changes due to aging and color correction. By providing both addressable portions on each driver chip problems associated with noise are minimized. In addition, providing a non-digitally controlled transistor on each addressable portion simplifies calibration and allows for more accuracy in control of uniformity. In the prior art, current regulation was provided using digitally addressable current mirrors, however, these were addressable such that current to the LED's could be varied from zero, to small amounts, and up to large amounts of current. By providing non-digitally controlled and continuously on transistors $Q_{13}$ and $Q_{33}$ both having substantial current-carrying capabilities, a minimum current (upon activation of an LED) will be produced in transistors $Q_{429}$, $Q_{429'}$, etc., the transistors carrying current to the LED's, even where the digital words stored in registers R1 and R2 cause no current to be carried in any of the digitally regulated transistors. Thus, these transistors ($Q_{13}$ and $Q_{33}$) effectively cooperate to provide a minimum offset current and the digitally controlled transistors can be addressed to provide control over the range of possible currents between the minimum offset current and the maximum current. Heretofore, control had to be calibrated between zero and maximum, requiring either more digitally addressed transistors to control this range or providing reduced ability to control to the desired degree.

Furthermore, control of current to the LED's is "corrected" for the color of the image frame being recorded. Thus, after calculating correction for aging of the printhead which can generally be considered a global factor for the printhead, further correction can be made for color which during recording of an image frame is also a global factor. Thus, a convenient way of correcting for local and global factors affecting a printhead has been described.

The invention is also applicable to other types of recording elements such as stylus, thermal, laser, ink jet, and similar printers.

The invention has been described in detail with particular reference to preferred embodiments thereof. However, it will be understood that variations and modifications may be effected within the spirit and scope of the invention.

What is claimed is:

1. A multi-color reproduction apparatus for recording differently colored images on a recording member, said apparatus comprising:
   a recording medium;
   an array of discrete elements for recording on the recording medium;
   driving means for selectively enabling the elements for predetermined periods of time during a cycle of operation to form an image on the recording member;
   means for producing a control signal representative at least in part of the color of the image; and
   digitally addressable means responsive to said control signal for changing the current to the elements during each cycle of operation according to a color to be recorded;
   the digitally addressable means including
   a) first digitally addressable current-conducting means for selectively establishing a first bias voltage in response to a first multibit digital signal;
   b) second digitally addressable current-conducting means responsive to the first bias voltage and to a second multibit digital signal for generating a bias current;
   c) means responsive to said bias current for establishing a second bias voltage;
   d) means for selectively causing current to flow through discrete elements selected for energization; and
   e) current mirror driver means for regulating current through said selected discrete elements, the level of current being related to said second bias voltage.

2. The reproduction apparatus as defined in claim 1 wherein the recording elements are light emitting diodes.

3. The reproduction apparatus according to claim 1 wherein the recording medium is a photoconductor, and further including means for developing a latent image with selected toner particles according to the signals related to the color of the image being recorded.

4. The reproduction apparatus of claim 1 and wherein the digitally addressable means is incorporated within each of a plurality of integrated circuit driver chips and wherein each driver chip further includes a continuously operating current conducting means cooperating with said first digitally addressable current-conducting means to establish an offset voltage bias level for said first voltage bias.

5. The reproduction apparatus of claim 4 and wherein each driver chip further includes a continuously operating current conducting means cooperating with said second digitally addressable current conducting means to establish an offset bias current level for said bias current.

6. The apparatus of claim 5 and wherein each driver chip further includes a temperature compensated current source means for providing a temperature adjusted current to said first digitally addressable current-conducting means for generating said first bias voltage.

7. The apparatus of claim 5 and including means for addressing one of the current conducting means with an adjustment signal related to the age of the printhead and the resolved color of an image being recorded.

8. The apparatus of claim 7 and including means for providing all the driver chips with the same adjustment signal related to the age of the printhead and the resolved color of the image being recorded.

9. The apparatus of claim 7 and including means for providing all the driver chips with the same adjustment signal related to the age of the printhead and the resolved color of the image being recorded.

10. The apparatus of claim 1 and including means for addressing one of the current-conducting means with an adjustment signal related to the age of the printhead and the resolved color of the image being recorded.

11. A non-impact printer apparatus used for recording, comprising:
  (a) a plurality of recording elements,
  (b) digitally addressable current-conducting means for selectively establishing a bias current in response to a multibit digital signal;
  (c) means responsive to said bias current for generating a bias voltage;
  (d) means for selectively causing current to flow through recording elements selected for energization;
  (e) current mirror means responsive to said bias voltage for regulating current through said selected recording elements, the level of current being related to said bias current, and
  (f) means for adjusting the bias voltage by providing a digital signal to the digitally addressable current-conducting means which digital signal is in response to the color of the image being recorded.

12. The printer apparatus of claim 11 and wherein the recording elements are light-emitting diodes.

13. The printer apparatus of claim 11 and further including a temperature compensated current source means for providing a temperature adjusted current to said digitally addressable current-conducting means.

14. The printer apparatus of claim 11 and including a plurality of integrated circuit driver chips each for driving respective groups of recording elements and each driver chip includes the means of paragraphs (b), (c), (d) and (e).

15. The printer apparatus of claims 11, 12, 13 or 14 and a continuously operating current conducting means cooperating with said digitally addressable current-conducting means to establish an offset bias current level for said bias current.

16. The apparatus of claims 11, 12, 13 or 14 in combination with a photoconductive recording medium;
  means for developing a latent image recorded on said recording medium with selected toner particles according to a signal related to the color of an image being recorded.

* * * * *